Figure 1:
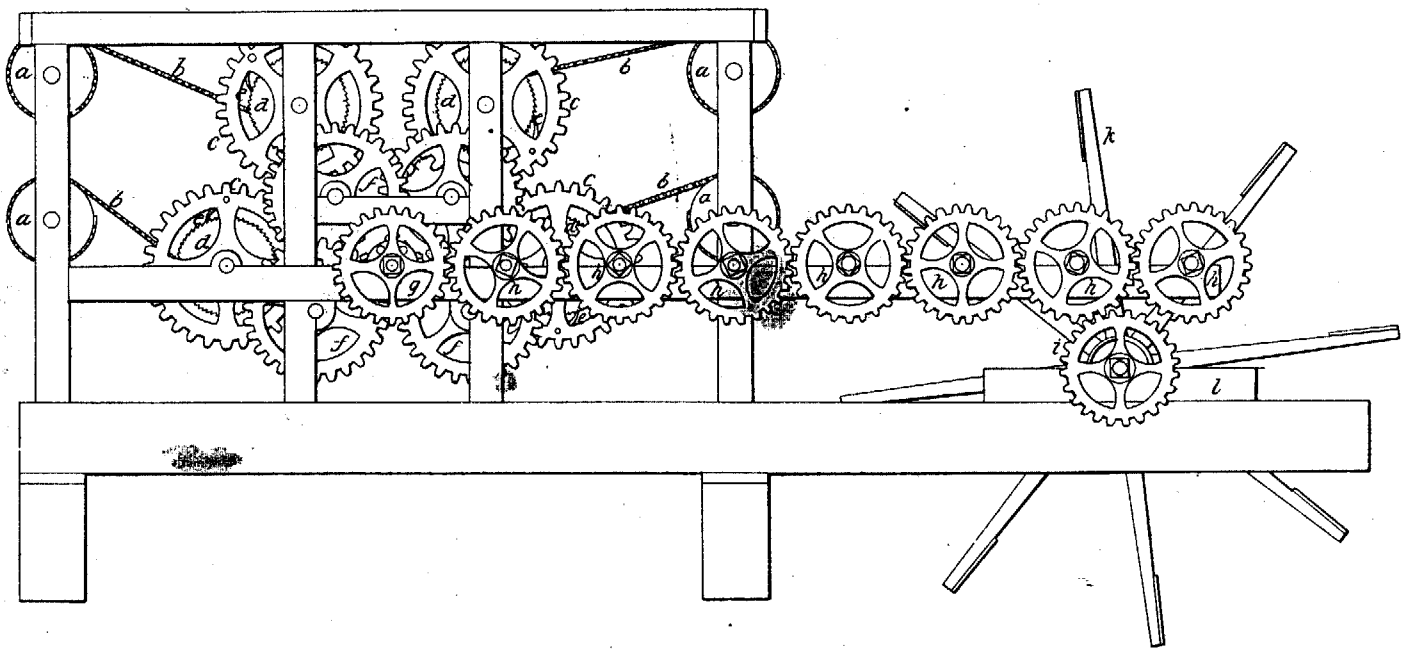
Figure 2:
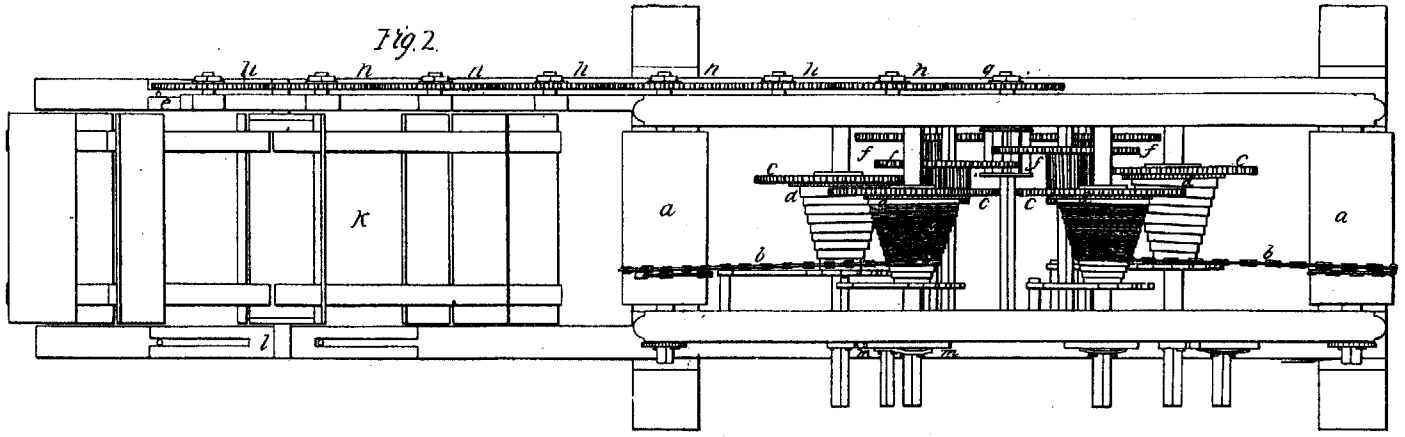
Figure 3:
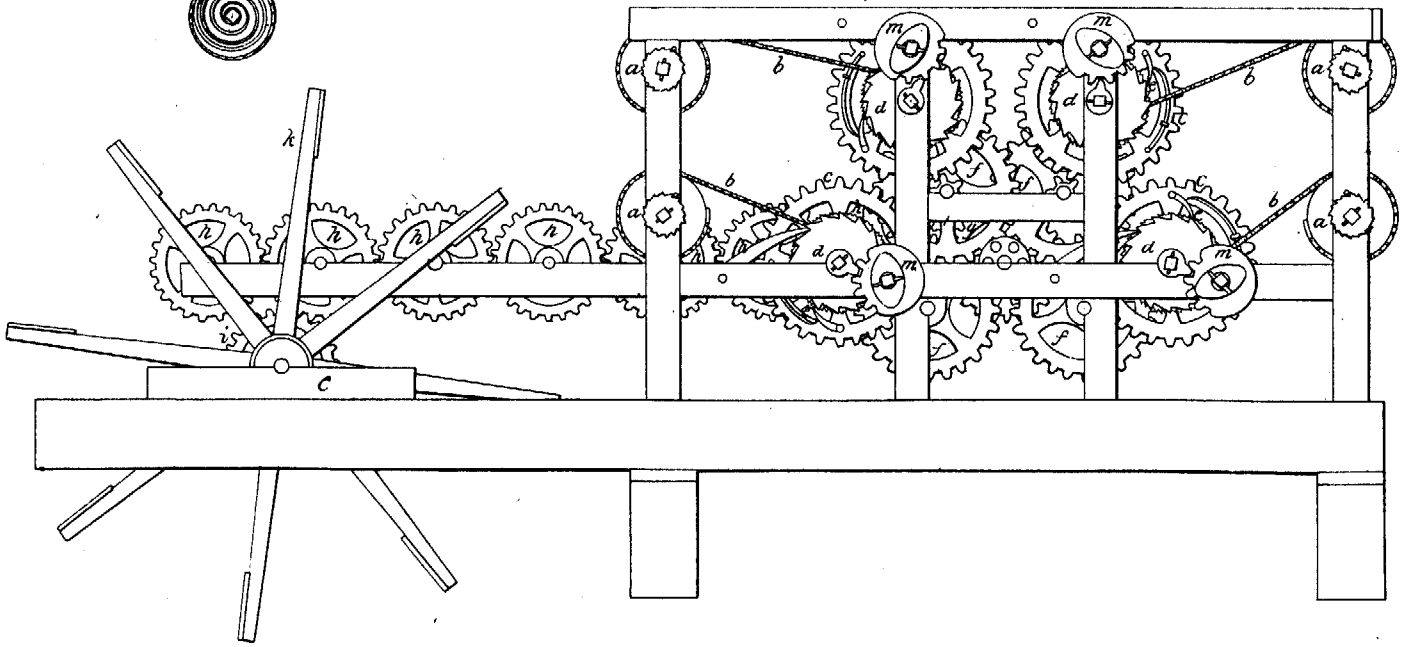
Figure 4:
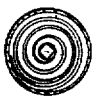

Sheet 1. 2 Sheets.

9330X

P. Noble.

Paddle Wheel.

Patented Jan. 20, 1836.

H. PETERS, PHOTO-LITHOGRAPHER, WASHINGTON, D. C.

9330X

P. Noble.

Paddle Wheel.

Patented Jan. 20, 1836.

N. PETERS, PHOTO-LITHOGRAPHER, WASHINGTON, D. C.

9330X

UNITED STATES PATENT OFFICE.

PHILANDER NOBLE, OF WESTFIELD, MASSACHUSETTS.

IMPROVEMENT IN MACHINES FOR PROPELLING BOATS.

Specification forming part of Letters Patent dated January 20, 1836.

*To all whom it may concern:*

Be it known that I, PHILANDER NOBLE, of Westfield, in the county of Hampden and Commonwealth of Massachusetts, have invented a new and useful Machine for Propelling Boats Without the Aid of Steam or Horse Power; and I do declare that the following is a full and exact description thereof.

This invention or improvement consists of the application of the machinery of a clock to the purpose contemplated.

Any number of faces, fusee-wheels, and barrels with springs may be so arranged (there are four in the model accompanying) that each shall bear upon a pinion seconds-wheel, and these pinion-wheels bear upon a center pinion, at the end of whose arbor is a wheel connected with a series of wheels matching into each other and communicating motion to a wheel at the end of the axis of the water-wheel, which is built in the usual way with paddles and is to be placed in the stern of the boat, though it may be used at the sides. This machinery is to be placed within a stout frame-work of wood or other substantial material. A strong iron chain made like a watch-spring is to be wound from the barrels upon the fusees, and to these are attached the usual ratchets, checks, and catches to regulate the winding, which is done by a key. The barrels and fusees are so arranged above and below the seconds-wheels and the center wheels as to allow a direct bearing upon the seconds-wheels, and these must be so disposed as to admit a direct bearing upon the center wheel, the bearing in both cases upon pinions. The center wheel is near the end of its arbor and outside of the frame-work, as are also the string or series of wheels connected and matching into the center wheel. The wheel at the end of the axis of the water-wheel is directly under the last two wheels in the series. The two ends of the axis of the water-wheel are placed upon or within a plumber-block of wood made to slide backward and forward and to be moved by lever-power. As the blocks are moved the wheel at the end of the axis is adjusted to one or the other of the wheels directly above, being the last two in the series. When adjusted to the one, the last in the series, the motion of the wheel and boat is forward. When adjusted to the other, the last but one, that motion is backward.

In the model with four fusees two are placed in a line above on two below, each having its corresponding seconds-wheels placed obliquely below it. The center wheel is on the same line with the lower fusee-wheels. The machinery may admit of a crank and shackle-bar, being substitute for the series of wheels. The wheels and machinery generally may be of iron or similar durable materials. A cylinder-wheel may be used also instead of the spring-wheel.

What I claim as my own invention and not previously known is—

Such an arrangement and application of the machinery described as shall operate to propel a boat or other craft through water instead of the usual application by steam or horse power.

PHILANDER NOBLE.

Witnesses:
W. B. CALHOUN,
SAMUEL SMITH.